(12) United States Patent
Park et al.

(10) Patent No.: US 12,741,388 B2
(45) Date of Patent: Sep. 22, 2026

(54) COMPLIANCE DEVICE AND WORKING ROBOT INCLUDING THE SAME

(71) Applicant: Samsung Electronics Co., Ltd., Suwon-si (KR)

(72) Inventors: Shibaek Park, Suwon-si (KR); Hansung Kim, Changwon-si (KR); Jooha Maeng, Suwon-si (KR); Youngsuk Park, Suwon-si (KR); Giseong Kim, Changwon-si (KR)

(73) Assignees: SAMSUNG ELECTRONICS CO., LTD., Suwon-si (KR); Industry-Academic Cooperation Foundation of Kyungam University, Changwon-si (KR)

( * ) Notice: Subject to any disclaimer, the term of this patent is extended or adjusted under 35 U.S.C. 154(b) by 216 days.

(21) Appl. No.: 18/527,465

(22) Filed: Dec. 4, 2023

(65) Prior Publication Data

US 2024/0253250 A1 Aug. 1, 2024

(30) Foreign Application Priority Data

Jan. 31, 2023 (KR) ........................ 10-2023-0013183

(51) Int. Cl.
*B25J 17/02* (2006.01)
*B25J 13/08* (2006.01)

(52) U.S. Cl.
CPC ......... *B25J 17/0225* (2013.01); *B25J 13/085* (2013.01)

(58) Field of Classification Search
CPC ............................ B25J 17/0225; B25J 13/085
USPC ....................................................... 74/490.01
See application file for complete search history.

(56) References Cited

U.S. PATENT DOCUMENTS

| | | | |
|---|---|---|---|
| 6,516,681 | B1 | 2/2003 | Pierrot et al. |
| 10,575,970 | B2 | 3/2020 | Holgate |

FOREIGN PATENT DOCUMENTS

| | | | |
|---|---|---|---|
| JP | 5205504 | B2 | 6/2013 |
| KR | 10-1963511 | B1 | 3/2019 |
| KR | 10-1997356 | B1 | 7/2019 |
| KR | 10-2125571 | B1 | 6/2020 |
| KR | 10-2224404 | B1 | 3/2021 |

(Continued)

OTHER PUBLICATIONS

Han Sung Kim, "Design of the 6-axis Compliance Device with F/T Sensing for Robotic Force Control Applications," 64 Journal of the Korea Industrial Convergence Society vol. 21, No. 2, pp. 63-70 (2018).

*Primary Examiner* — T. Scott Fix
(74) *Attorney, Agent, or Firm* — Muir Patent Law, PLLC

(57) ABSTRACT

A compliance device includes a fixed platform in which a fixed origin of a fixed coordinate system having 3 axes of X-Y-Z is defined, a moving platform which is configured to move relative to the fixed platform and in which a moving origin of a moving coordinate system having 3 axes of x-y-z is defined, and a compliance mechanism including a plurality of unit compliance mechanisms configured to elastically support the moving platform against the fixed platform, each of the plurality of unit compliance mechanisms including a cantilever structure, which includes a first end fixed to the fixed platform and a second end on the opposite side from the first end, and a link, which is coupled to the second end of the cantilever structure via a first ball joint and coupled to the moving platform via a second ball joint.

20 Claims, 13 Drawing Sheets

(56) References Cited

FOREIGN PATENT DOCUMENTS

| | | | | | |
|---|---|---|---|---|---|
| KR | 10-2354643 | B1 | | 1/2022 | |
| KR | 20230156540 | A | * | 11/2023 | .......... B25J 17/0216 |
| WO | WO-2017016939 | A1 | * | 2/2017 | ............ B25J 13/085 |

* cited by examiner

COMPLIANCE DEVICE AND WORKING ROBOT INCLUDING THE SAME

CROSS-REFERENCE TO RELATED APPLICATION

This application is based on and claims priority under 35 U.S.C. § 119 to Korean Patent Application No. 10-2023-0013183, filed on Jan. 31, 2023, in the Korean Intellectual Property Office, the disclosure of which is incorporated by reference herein in its entirety.

BACKGROUND

Aspects of the inventive concept relate to a compliance device and a working robot including same.

Industrial robots are widely used in various fields. In general, in order to compensate for errors of robots during work using the robots, robot control is performed using a force/torque (F/T) sensor that measures F/T acting between a work tool and a workpiece, a vision device, etc. However, this robot control is complicated, making rapid work difficult and requiring high costs.

SUMMARY

Aspects of the inventive concept provide a compliance device that provides compliant characteristics.

Aspects of the inventive concept also provide a working robot that includes the compliance device.

According to an aspect of the inventive concept, there is provided a compliance device that includes a fixed platform in which a fixed origin of a fixed coordinate system having 3 axes of X-Y-Z is defined, a moving platform which is configured to move relative to the fixed platform and in which a moving origin of a moving coordinate system having 3 axes of x-y-z is defined, and a compliance mechanism including a plurality of unit compliance mechanisms configured to elastically support the moving platform against the fixed platform, each of the plurality of unit compliance mechanisms including a cantilever structure, which includes a first end fixed to the fixed platform and a second end opposite to the first end, and a link, which is coupled to the second end of the cantilever structure via a first ball joint and coupled to the moving platform via a second ball joint.

According to another aspect of the inventive concept, there is provided a working robot that includes a robot arm, a compliance device mounted to an end of the robot arm, and a work tool connected to the compliance device and configured to hold a workpiece, wherein the compliance device includes a fixed platform in which a fixed origin of a fixed coordinate system having 3 axes of X-Y-Z is defined, a moving platform which is configured to move relative to the fixed platform and in which a moving origin of a moving coordinate system having 3 axes of x-y-z is defined, a compliance mechanism including a plurality of unit compliance mechanisms configured to elastically support the moving platform against the fixed platform, each of the plurality of unit compliance mechanisms including a cantilever structure, which includes a first end fixed to the fixed platform and a second end opposite to the first end, and a link, which is coupled to the second end of the cantilever structure via a first ball joint and coupled to the moving platform via a second ball joint, a linear actuator mounted on the moving platform and configured to move a work tool in a Z-axis direction, a moving plate connected to the linear actuator and configured to be moved in the Z-axis direction by the linear actuator, and a rotary actuator mounted on the moving plate and configured to rotate the work tool about an axis parallel to the Z-axis direction.

According to another aspect of the inventive concept, there is provided a compliance device that includes a fixed platform in which a fixed origin of a fixed coordinate system having 3 axes of X-Y-Z is defined, a moving platform which is configured to move relative to the fixed platform and in which a moving origin of a moving coordinate system having 3 axes of x-y-z is defined, a compliance mechanism including a plurality of unit compliance mechanisms configured to elastically support the moving platform against the fixed platform, each of the plurality of unit compliance mechanisms including a cantilever structure, which includes a first end fixed to the fixed platform and a second end on the opposite side from the first end, and a link, which is coupled to the second end of the cantilever structure via a first ball joint and coupled to the moving platform via a second ball joint, a linear actuator mounted on the moving platform and configured to move a work tool in a Z-axis direction, a moving plate connected to the linear actuator and configured to be moved in the Z-axis direction by the linear actuator, a rotary actuator mounted on the moving plate and configured to rotate the work tool about the Z-axis, a force/moment sensor which includes unit sensors configured to sense amounts of elastic deformation of the plurality of unit compliance mechanisms, and is configured to detect a force in an X-axis direction, a force in a Y-axis direction, a moment about the X-axis as a rotation central axis, and a moment about the Y-axis as a rotation central axis which act on the moving origin of the moving platform, a double universal joint which is located between the fixed platform and the moving platform and configured to limit rotation of the moving platform about the Z-axis, and a gravity compensation mechanism that includes a first spring support coupled to the moving platform, a second spring support coupled to the fixed platform, and a tension spring connected to the first spring support and the second spring support, wherein each of the plurality of unit compliance mechanisms is configured such that a straight-line distance between the first ball joint and the second ball joint is variable.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Figure 1A:
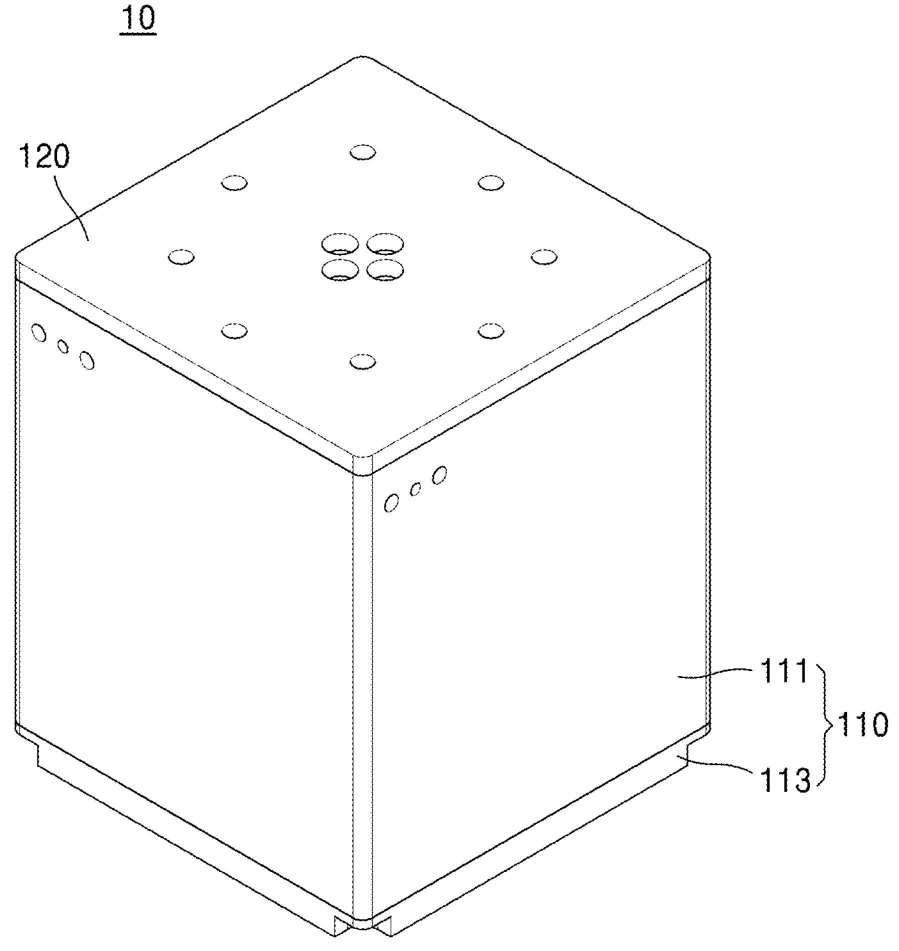
FIGS. 1A and 1B are perspective views showing a compliance device according to some embodiments.
Figure 1B:
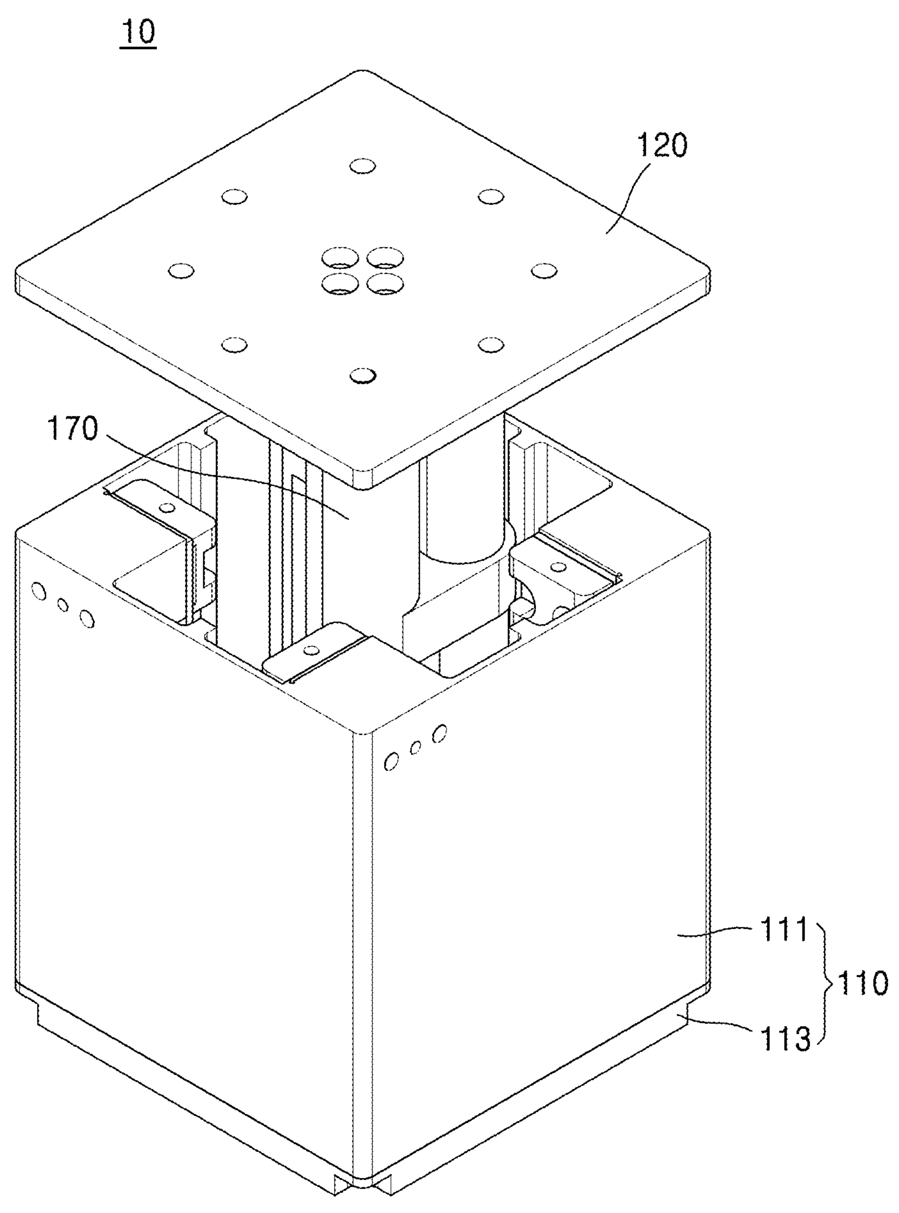

Hereinafter, embodiments of the inventive concept are described in detail with reference to the accompanying drawings. The same reference numerals are given to the same elements in the drawings, and repeated descriptions thereof are omitted.

As used herein, an axial direction may refer to an X-axis direction, a Y-axis direction, or a Z-axis direction. A rotational direction represents a direction having a rotation axis parallel to the axial direction, and may refer to a rotational direction having a rotation axis parallel to the X-axis direction, a rotational direction having a rotation axis parallel to the Y-axis direction, or a rotational direction having a rotation axis parallel to the Z-axis direction. In addition, a position error may refer to an error in the axial direction (X-axis direction, Y-axis direction, or Z-axis direction), and a rotation error may refer to an error in the rotational direction. The X-axis direction, the Y-axis direction, and the Z-axis direction may be directions parallel to the respective X-axis, Y-axis and Z-axis. For example, the X-axis direction, the Y-axis direction, and the Z-axis direction may be respectively an X direction, a Y direction, and a Z direction.

Figure 2:
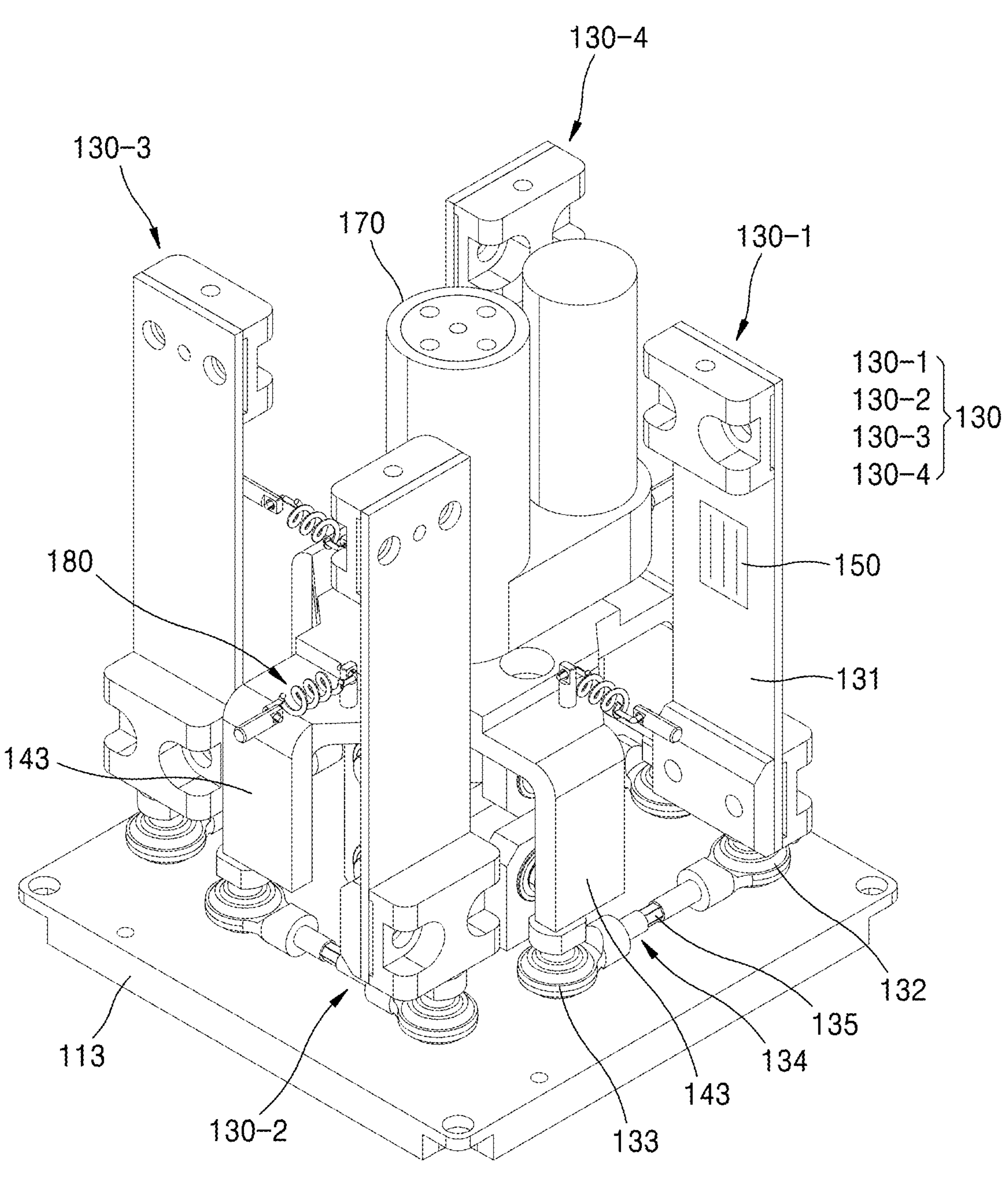
FIG. 2 is a perspective view showing the inside of the compliance device according to some embodiments.
Figure 3:
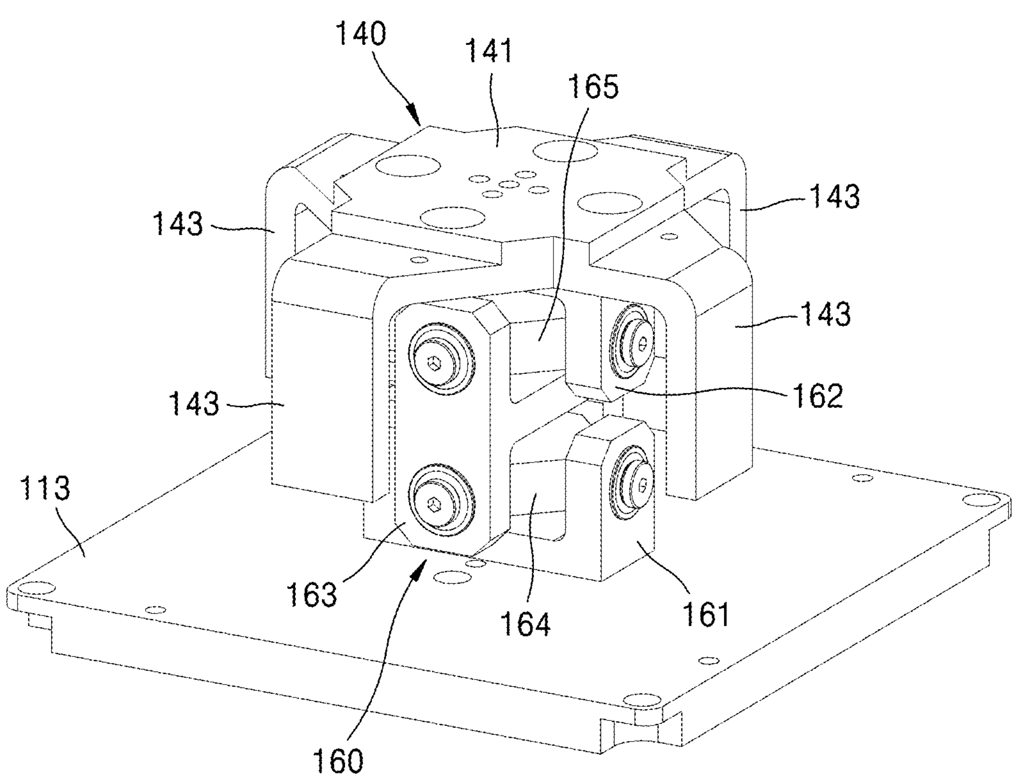
FIG. 3 is a perspective view showing a moving platform and a universal joint of the compliance device according to some embodiments.
Figure 4A:
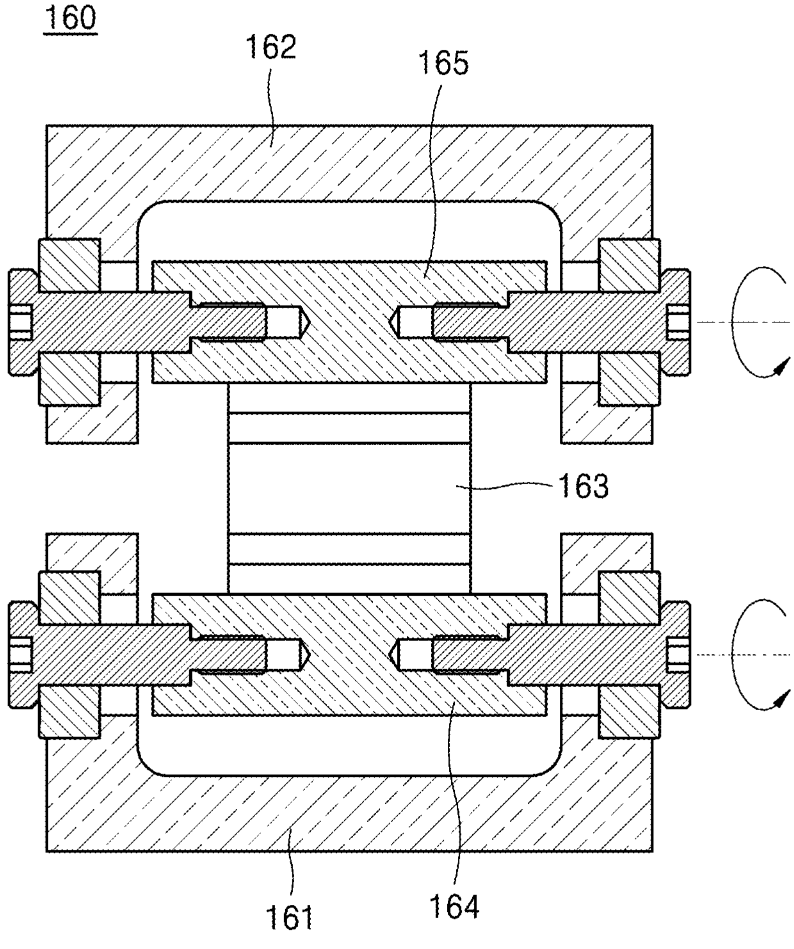
FIGS. 4A and 4B are cross-sectional views showing different cross-sections of a universal joint of a compliance device according to some embodiments.
Figure 4B:
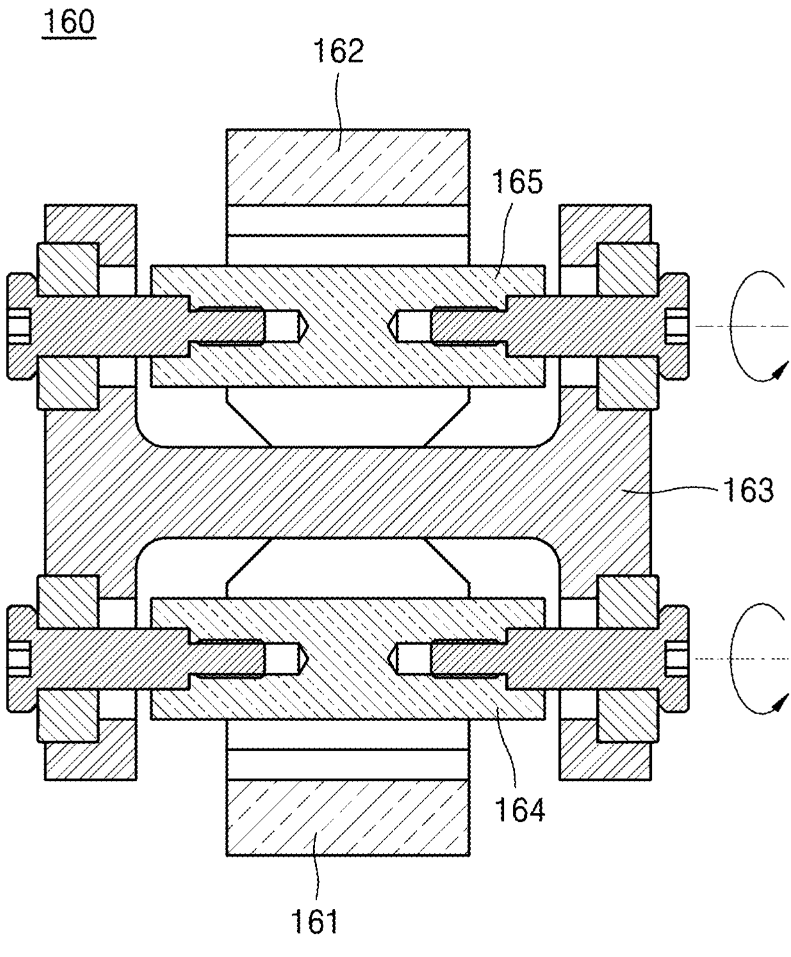

FIGS. 1A to 4B are views showing a compliance device 10 according to some embodiments. FIGS. 1A and 1B are perspective views showing the compliance device 10, FIG. 2 is a perspective view showing the inside of the compliance device 10, and FIG. 3 is a perspective view showing a moving platform 140 and a universal joint 160 of the compliance device 10. FIGS. 4A and 4B are cross-sectional views showing different cross-sections of the universal joint 160 of the compliance device 10 according to some embodiments.

Referring to FIGS. 1A to 4B, the compliance device 10 may be provided in a working robot for performing various work on a workpiece. The compliance device 10 may be connected to a work tool configured to handle a workpiece. The work tool may be an end effector and may include or may be, for example, a gripper configured to hold a workpiece.

The compliance device 10 may provide compliant characteristics in one or more axial directions and in one or more rotational directions. When performing work on a workpiece using a work tool, the compliant characteristics of the compliance device 10 provide flexibility to absorb an external force that acts between the work tool and the workpiece, thereby preventing damage to the work tool and/or workpiece and improving the reliability of work. In certain embodiments, the compliance device 10 may have 4-axis compliant characteristics for two axial directions and two rotational directions. For example, the compliance device 10 may have compliant characteristics for the X-axis direction, the Y-axis direction, the rotational direction having a rotation axis parallel to the X-axis direction, and the rotational direction having a rotation axis parallel to the Y-axis direction.

The compliance device 10 may be configured to sense and measure forces acting in one or more axial directions and/or moments acting about one or more axial directions. In some embodiments, the compliance device 10 may have a 4-axis force/moment measurement function for measuring forces acting in two axial directions and/or moments acting about two axial directions. For example, the compliance device 10 may be configured to measure a force ($F_x$) acting in the X-axis direction, a force ($F_y$) acting in the Y-axis direction, a moment ($M_x$) acting about an axis parallel to the X-axis direction (e.g., about the X-axis), and a moment ($M_y$) acting about an axis parallel to the Y-axis direction (e.g., about the Y-axis). As data on the force/moment obtained by the compliance device 10 is utilized for control and/or experimental data of a working robot, the reliability of work of the working robot using the compliance device 10 may be improved.

The compliance device 10 may include a fixed platform 110, a moving plate 120, a compliance mechanism 130, the moving platform 140, a force/moment sensor 150, the universal joint 160, and a linear actuator 170.

The fixed platform 110 may have a fixed origin of a fixed coordinate system with 3 axes of X-Y-Z (See FIG. 6), e.g., respectively extending in X, Y and Z directions. For example, the fixed origin and the 3 axes of X-Y-Z may be used as references in controlling (e.g., positioning) of the moving plate 120, the compliance mechanism 130, the moving platform 140, the force/moment the sensor 150, the universal joint 160 and/or the linear actuator 170. The compliance device 10 is installed at one end of a robot arm of a working robot, and the fixed coordinate system of the fixed platform 110 may be defined to coincide with a work coordinate system formed at the one end of the working robot. The fixed platform 110 may include a base plate 113 and vertical sidewalls 111 connected to (e.g., contacting) edges of the base plate 113. For example, the vertical sidewalls 111 may vertically extend (e.g., lengthwise) from and contact a top surface of the base plate 113. In certain embodiments, the vertical sidewalls 111 may vertically extend (e.g., lengthwise) from and contact side surfaces of the base plate 113. For example, the fixed platform 110 may include four vertical sidewalls 111, that is, first to fourth sidewalls. The fixed platform 110 may provide an inner space in which components of the compliance device 10 are accommodated. Here, “lengthwise” of/for an element may mean “in the direction of the longest side” of/for the element.

It will be understood that when an element is referred to as being “connected” or “coupled” to or “on” another element, it can be directly connected or coupled to or on the other element or intervening elements may be present. In contrast, when an element is referred to as being “directly connected” or “directly coupled” to another element, or as “contacting” or “in contact with” another element, there are no intervening elements present at the point of contact.

The moving platform 140 may be located within the inner space provided by the fixed platform 110. The moving platform 140 may be disposed on the base plate 113 of the fixed platform 110. The moving platform 140 may be spaced apart from the fixed platform 110 and may be configured to move relative to the fixed platform 110. The moving platform 140 may have a moving origin of a moving coordinate system with 3 axes of x-y-z (see FIG. 6). The moving origin and the three axes of x-y-z may be used as references in controlling relative positions of components (e.g., moving plate 120, a rotatory actuator 190 described blow, a work tool 210 described below, etc.) with respect to the moving platform 140. The movement of the moving platform 140 may be interlocked with the movement of a work tool connected to the compliance device 10, and the displacement of the moving platform 140 may be related to the displacement of the work tool.

The moving platform 140 may include a central plate 141 and a plurality of legs 143 extending (e.g., lengthwise) from different sides of the central plate 141. For example, the moving platform 140 may include four legs 143. The central plate 141 may be spaced apart from the base plate 113 of the fixed platform 110 in the Z-axis direction and may extend parallel or substantially parallel to the base plate 113 of the fixed platform 110, e.g., extending on an X-Y plane. Each of the plurality of legs 143 may extend (e.g., lengthwise) downward from the side of the central plate 141 toward the base plate 113 of the fixed platform 110. The plurality of legs 143 may be arranged along the edges of the central plate 141 at constant angles (e.g., in a radial direction with respect to a center point of the central plate 141).

The compliance mechanism 130 may be located between the fixed platform 110 and the moving platform 140. The compliance mechanism 130 may include a plurality of unit compliance mechanisms (i.e., first to fourth unit compliance mechanisms 130-1, 130-2, 130-3, and 130-4), each of which is configured to elastically support the moving platform 140 against the fixed platform 110. For example, the compliance mechanism 130 may have a function maintaining relative positions between the moving platform 140 and the fixed platform 110 with a variation caused by a certain range of elastic deformation. In some embodiments, the plurality of legs 143 of the moving platform 140 have first to fourth legs. The first leg may be rotatably coupled to the first unit compliance mechanism 130-1 by a ball joint, the second leg may be rotatably coupled to the second unit compliance mechanism 130-2 by a ball joint, the third leg may be rotatably coupled to the third unit compliance mechanism 130-3 by a ball joint, and the fourth leg may be rotatably coupled to the fourth unit compliance mechanism 130-4 by a ball joint.

Each of the first to fourth unit compliance mechanisms 130-1, 130-2, 130-3, and 130-4 may include a cantilever structure 131, a first ball joint 132, a link 135, and a second ball joint 133. The cantilever structure 131 may have a plate shape extending (e.g., lengthwise) in the Z-axis direction and may include first and second ends opposite to each other in the Z-axis direction. The first end of the cantilever structure 131 may be a fixed end fixed to one sidewall of the fixed platform 110, and the second end of the cantilever structure 131 may be a movable free end. The first end of the cantilever structure 131 may be an upper end relatively far from the base plate 113 of the fixed platform 110, and the second end of the cantilever structure 131 may be a lower end relatively adjacent to the base plate 113 of the fixed platform 110. The link 135 may be rotatably coupled to the second end of the cantilever structure 131 via the first ball joint 132 and may be rotatably coupled to a lower end of a corresponding leg 143 of the plurality of legs 143 of the moving platform 140 via the second ball joint 133. The link 135 may extend (e.g. lengthwise) in a direction that crosses both an extension direction (e.g., a length direction) of the corresponding cantilever structure 131 and an extension direction (e.g., a length direction) of the corresponding leg 143 of the moving platform 140. The link 135 may extend (e.g., lengthwise) in a direction perpendicular to the extension direction (e.g., a length direction) of the cantilever structure 131 (e.g., the X-axis direction or the Y-axis direction). The first end of the cantilever structure 131 is in surface contact with the corresponding vertical sidewall 111 of the fixed platform 110, and the second end of the cantilever structure 131 is rotatably coupled to the link 135 via the first ball joint 132. Accordingly, it is possible to prevent torsional deformation of the cantilever structure 131. As the torsional deformation of the cantilever structure 131 is prevented, it is possible to simplify a force and moment detection process by analyzing the tensile and compressive forces applied to the cantilever structure 131.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The first to fourth unit compliance mechanisms 130-1, 130-2, 130-3, and 130-4 of the compliance mechanism 130 may support the moving platform 140 against the fixed platform 110 in a parallel manner and may thus constitute a parallel mechanism. A parallel mechanism may have a mechanism with 4 degrees of freedom. The parallel mechanism may have degrees of freedom with respect to the X-axis direction, the Y-axis direction, the rotational direction having a rotation axis parallel to the X-axis direction, and the rotational direction having a rotation axis parallel to the Y-axis direction.

Each unit compliance mechanism may have a prismatic joint (or linear joint)-spherical joint (or ball joint)-spherical joint (or ball joint) structure (hereinafter, referred to as a PSS structure). The cantilever structure 131 may constitute a linear joint of each unit compliance mechanism. In some embodiments, the stiffness of the compliance mechanism 130 may be adjusted by controlling the thickness and/or length of the cantilever structure 131 according to (depending on) a workpiece and/or a work type.

In embodiments, each of the first to fourth unit compliance mechanisms 130-1, 130-2, 130-3, and 130-4 of the compliance mechanism 130 may be configured such that the length of the link 135 (or the straight-line distance between the first ball joint 132 and the second ball joint 133) is variable. Each of the first to fourth unit compliance mechanisms 130-1, 130-2, 130-3, and 130-4 of the compliance mechanism 130 may include an adjustment screw 134 for adjusting the length of the link 135. The adjustment screw 134 may be used to adjust the length of the link 135 or the straight-line distance between the first ball joint 132 and the second ball joint 133. As the straight-line distance between the first ball joint 132 and the second ball joint 133 is adjusted by the adjustment screw 134, the joint clearance and stiffness of the compliance mechanism 130 may be adjusted. In some embodiments, each of the first ball joint 132 and the second ball joint 133 may be provided in the form of a rod end bearing, and the link 135 may be provided in the form of a connecting shaft that connects the two rod end bearings to each other. Here, each of the two rod end bearings is engaged with screw threads formed on an outer circumferential surface of the connecting shaft, and the positions of the two rod end bearings relative to the connecting shaft may be fixed by the adjustment screw 134.

The force/moment sensor 150 may sense the amounts of elastic deformation of the first to fourth unit compliance mechanisms 130-1, 130-2, 130-3, and 130-4 of the compliance mechanism 130 and may detect the force and moment acting on the moving origin of the moving platform 140. The force/moment sensor 150 may include a plurality of unit sensors respectively mounted on the cantilever structures 131 of unit compliance mechanisms 130-1, 130-2, 130-3, and 130-4 and one or more microcontrollers configured to process detection signals detected/output from the unit sensors. In embodiments, each of the unit sensors may include or may be a strain gauge. When an external force acts on the moving platform 140 to move the moving origin of the moving platform 140 relative to the fixed origin of the fixed platform 110, the unit sensors respectively mounted on the cantilever structures 131 of unit compliance mechanisms may sense the amounts of elastic deformation of the cantilever structures 131. Accordingly, based on the signals transmitted from the unit sensors (signals including the amounts of elastic deformation of the cantilever structures 131), the microcontroller may detect a force in the X-axis direction, a force in the Y-axis direction, a moment about an axis parallel to the X-axis direction (e.g., about the X-axis) as a rotation central axis (e.g., an axis of rotation), and a moment about an axis parallel to the Y-axis direction (e.g., about the Y-axis) as a rotation central axis (e.g., an axis of rotation) which act on the moving origin of the moving platform 140.

The universal joint 160 may be located between the base plate 113 of the fixed platform 110 and the moving platform 140. The universal joint 160 may be configured to limit rotation of the moving platform 140 about an axis parallel to the Z-axis direction (e.g., about the Z-axis). The rotational movement of the moving platform 140 about an axis parallel to the Z-axis direction (e.g., about the Z-axis) is limited by the universal joint 160, and thus, generation of a moment about an axis parallel to the Z-axis direction (e.g., about the Z-axis) as a rotation central axis (e.g., an axis of rotation) may be limited. Accordingly, force/moment measurement for the compliance mechanism 130 may be simplified. In addition, the universal joint 160 may permit a minute displacement of the moving platform 140, thereby functioning as a shock absorbing member against an external force applied to the moving platform 140.

In embodiments, the universal joint 160 may include a lower block 161 fixed to the base plate 113 of the fixed platform 110, an upper block 162 fixed to the central plate 141 of the moving platform 140, and a middle block 163 connected to the lower block 161 via a lower cross shaft 164 and connected to the upper block 162 via an upper cross shaft 165. The upper cross shaft 165 may be positioned above the lower cross shaft 164 and may be located between the lower cross shaft 164 and the central plate 141. Each of the upper cross shaft 165 and the lower cross shaft 164 may have a rotation axis parallel to the X-axis direction and a rotation axis parallel to the Y-axis direction. For example, the lower cross shaft 164 may rotate relative to the lower block 161 in the X-axis direction, the middle block 163 may rotate relative to each of the lower cross shaft 164 and the upper cross shaft 165 in the Y-axis direction, and the upper block 162 may rotate relative to the upper cross shaft 165 in the X-axis direction. Accordingly, the universal joint 160 includes a universal joint having 2 degrees of freedom defined between the lower block 161 and the middle block 163 and a universal joint having 2 degrees of freedom defined between the upper block 162 and the middle block 163 and may thus be a double universal joint having 4 degrees of freedom overall.

The linear actuator 170 may be responsible for linear movement of a work tool, e.g., movement of the work tool in the Z-axis direction. For example, the linear actuator 170 may move the moving plate 120 relative to the moving platform 140 in the Z-axis direction, and the work tool connected to the moving plate 120 may move when the moving plate 120 moves. The linear actuator 170 may be mounted on the moving platform 140 and may include a motor and a cylinder. In the linear actuator 170, the cylinder may be connected/attached to the moving plate 120 and may be moved in the Z-axis direction by the motor.

Due to the linear movement of the linear actuator 170, the moving plate 120 may move in the Z-axis direction, e.g., upward, from a position, at which the moving plate 120 is in contact with the sidewalls of the fixed platform 110, and the work tool connected to the moving plate 120 may move in the Z-axis direction. Due to the linear movement of the moving plate 120, the moving plate 120 may move between a position, at which the moving plate 120 is in contact with the sidewalls of the fixed platform 110 to cover the inner space of the fixed platform 110, and a position, at which the moving plate 120 is spaced apart from the sidewalls of the fixed platform 110 to expose the inner space of the fixed platform 110.

Figure 5:
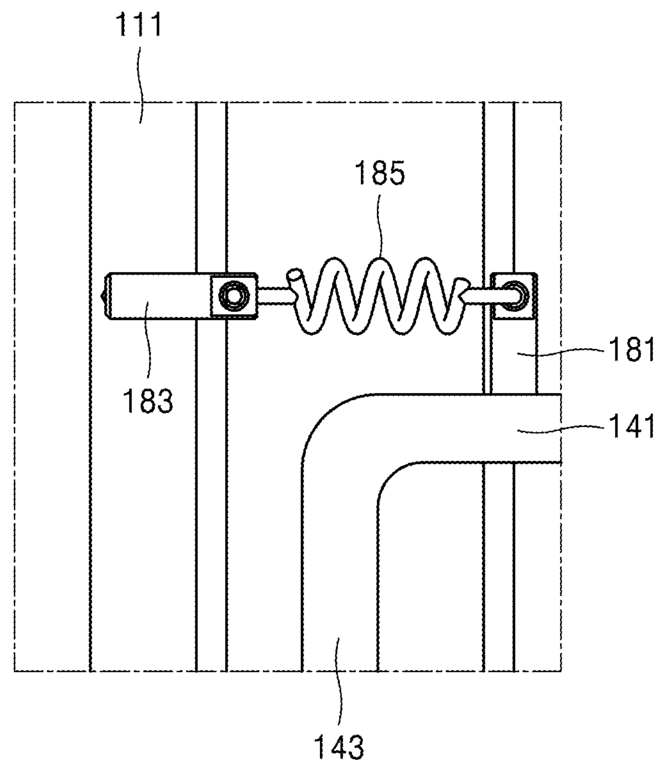
FIG. 5 is a cross-sectional view showing a gravity compensation mechanism of a compliance device according to some embodiments.

FIG. 5 is a cross-sectional view showing a gravity compensation mechanism 180 of the compliance device 10 according to embodiments.

Referring to FIG. 5 together with FIGS. 1A to 3, the compliance device 10 may include the gravity compensation mechanism 180 for canceling and/or reducing the effect of gravity caused by the weight of a workpiece. For example, when the working robot including the compliance device 10 handles a workpiece with a large weight, the gravity compensation mechanism 180 may be configured to compensate for the weight of the workpiece and the torque generated by the weight of the workpiece.

The gravity compensation mechanism 180 may include a first spring support 181 coupled to (e.g., contacting) the moving platform 140, a second spring support 183 coupled to (e.g., contacting) the fixed platform 110, and a tension spring 185 which has one end connected to (e.g., contacting) the first spring support 181 and the other end connected to (e.g., contacting) the second spring support 183. The tension spring 185 may provide a restoring force to the moving platform 140. The gravity compensation mechanism 180 may include a plurality of tension springs 185 configured to provide restoring forces to the moving platform 140 in different directions. Each of the plurality of tension springs 185 may have one end connected to the moving platform 140 and the other end connected to the fixed platform 110. For example, the gravity compensation mechanism 180 may include a tension spring 185 extending (e.g., lengthwise) in a (+)X-axis direction from the moving platform 140 to the fixed platform 110, a tension spring 185 extending (e.g., lengthwise) in a (−)X-axis direction from the moving platform 140 to the fixed platform 110, a tension spring 185 extending (e.g., lengthwise) in a (+)Y-axis direction from the moving platform 140 to the fixed platform 110, and a tension spring 185 extending (e.g., lengthwise) in a (−)Y-axis direction from the moving platform 140 to the fixed platform 110. For example, the gravity compensation mechanism 180 may include four or more tension springs 185 connected between the fixed platform 110 (e.g., vertical sidewalls 111 of the fixed platform 110) and the moving platform 140.

Figure 6:
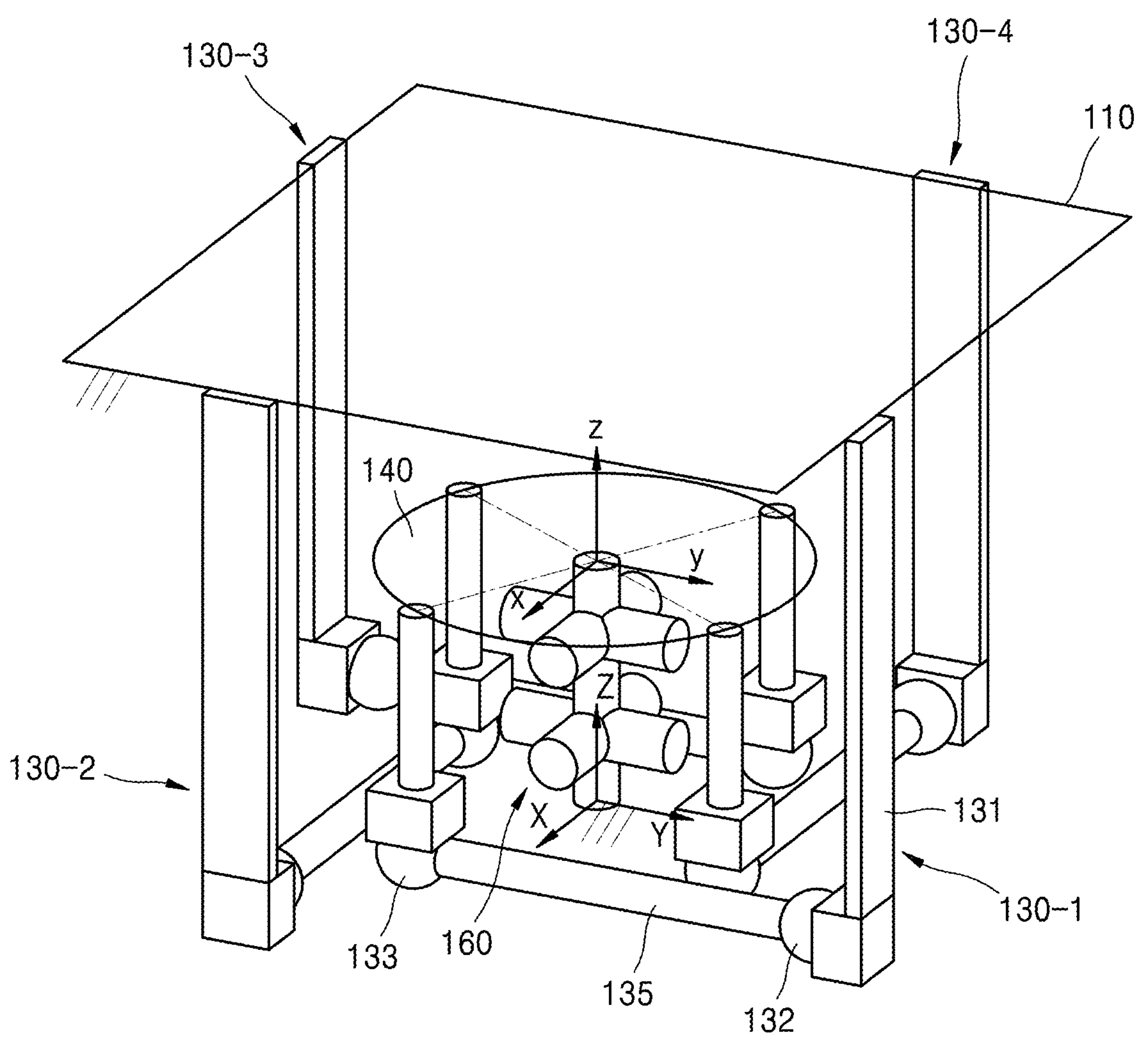
FIGS. 6, 7A, and 7B are conceptual views schematically showing compliant characteristics of a compliance device according to some embodiments.
Figure 7A:
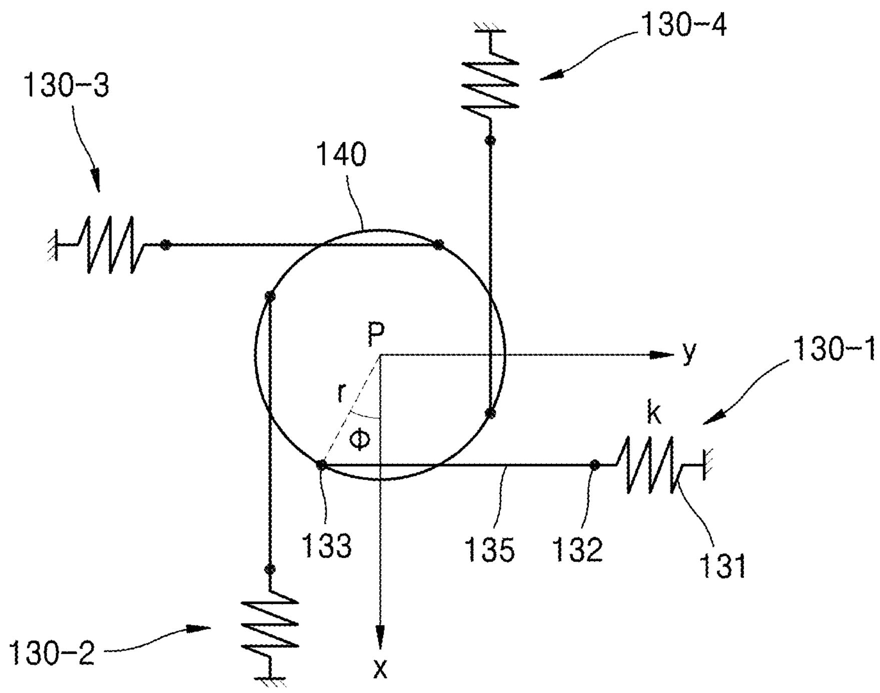
Figure 7B:
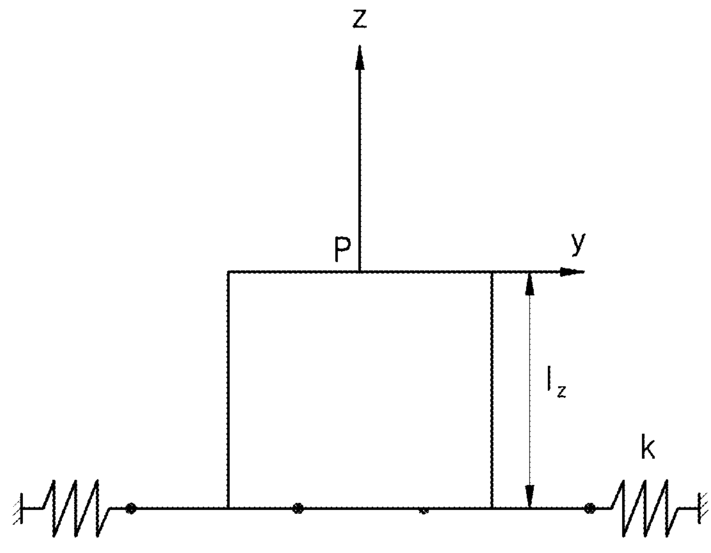

FIGS. 6, 7A, and 7B are conceptual drawings/views schematically showing compliant characteristics of the compliance device 10.

Referring to FIGS. 6, 7A, and 7B together with FIGS. 1A to 3, the compliance device 10 may have 4 axis-compliant characteristics and include a 4-PSS parallel mechanism in which the moving platform 140 is supported in a parallel manner by the first to fourth unit compliance mechanisms 130-1, 130-2, 130-3, and 130-4.

The compliance device 10 is mounted on the end of a working robot and may be used for position and force control during work performed by using the working robot. A twist at the end of the working robot is divided into the twist of freedom and the twist of compliance, and each is used for the position and force control. The twist of freedom $\delta D_f$ representing a position control direction and the wrench of constraint $\delta w_c$ representing a force control direction are defined at one point P of the moving platform 140, and the twist of freedom $\delta D_f$ and the wrench of constraint $\delta w_c$ have a reciprocal relation expressed by Equation (1).

$$\delta D_f^T \delta w_c = 0 \tag{1}$$

Here, when $\delta p$ and $\delta\theta$ represent a small linear displacement vector and a small rotation displacement vector, respectively, $\delta D=[\delta p^T, \delta\theta^T]^T$ represents twist expressed in axis coordinates. Also, when f and n represent a force vector and a moment vector, respectively, $\omega=[f^T, n^T]^T$ represents a wrench expressed in ray coordinates.

Here, the wrench acting on the workpiece is controlled by the motion of an end of the working robot. The twist of compliance $\delta D_c$ may be defined by the wrench of constraint $\delta w_c$ and a stiffness matrix K in Equation (2) that is defined by stiffness k of the cantilever structure 131 and/or stiffness of each unit compliance mechanism.

$$\delta D_c = -K^{-1}\delta w_c \tag{2}$$

Here, the stiffness matrix K may be calculated through a Jacobian matrix J as follows.

$$K = J[k]J^T = \begin{bmatrix} 2k & 0 & 0 & 0 & 2kl_z & 0 \\ 0 & 2k & 0 & -2kl_z & 0 & 0 \\ 0 & 0 & k_l & 0 & 0 & 0 \\ 0 & -2kl_z & 0 & 2kl_z^2 & 0 & 0 \\ 2kl_z & 0 & 0 & 0 & 2kl_z^2 & 0 \\ 0 & 0 & 0 & 0 & 0 & k_r + 4r^2k(\cos\phi)^2 \end{bmatrix}$$

Here, $k_l$ and $k_r$ are values for a rigid body and thus theoretically represent infinite values. $l_z$ represents a distance from a contact point between the cantilever structure 131 and the first ball joint 132 to the moving platform 140 in the Z-axis direction.

The twist of freedom $\delta D_f$ for the position control and the twist of compliance $\delta D_c$ for the force control may be calculated from Equation (1) and Equation (2). Accordingly, it is possible to perform the position/force control for the working robot including the compliance device 10. In embodiments, the stiffness of each unit compliance mechanism constituting the parallel mechanism may be adjusted, and thus, appropriate compliant characteristics may be provided according to the type of work and/or the type of workpiece. Accordingly, the reliability of work using the working robot may be improved.

Figure 8:
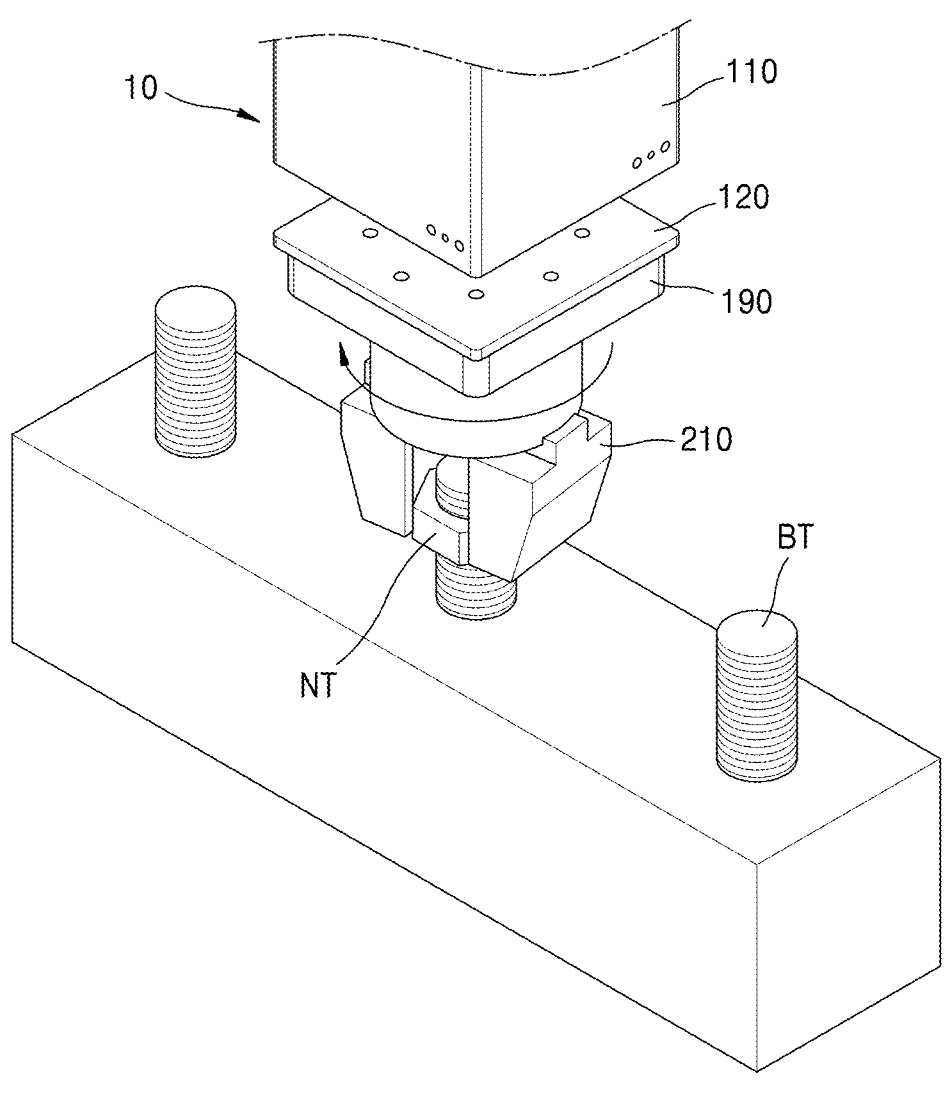
FIG. 8 is a perspective view showing an example of work using a compliance device according to some embodiments.

FIG. 8 is a perspective view showing an example of work using a compliance device 10 according to some embodiments.

Referring to FIG. 8, the compliance device 10 may further include a rotary actuator 190 configured to rotate a work tool 210. The rotary actuator 190 may be mounted on a moving plate 120 and may be connected to the work tool 210. The rotary actuator 190 may be responsible for the rotational movement of the work tool 210, e.g., the rotational movement of the work tool 210 having a rotation axis parallel to Z-axis direction.

In some embodiments, the compliance device 10 may include a linear actuator 170 and the rotary actuator 190, which include active axes for performing work (e.g., component fastening work) using the work tool 210 configured to hold a workpiece such as a gripper. For example, after holding a nut NT by the work tool 210, the linear movement of the work tool 210 by the linear actuator 170 and the rotational movement of the work tool 210 by the rotary actuator 190 are performed. Accordingly, the component fastening work of fastening the nut NT to a bolt BT may be well performed. Therefore, according to embodiments, the compliance device 10 includes the linear actuator 170 and the rotary actuator 190, which include active axes for performing work using the work tool 210, and thus, work may be performed by simply controlling the active axes of the compliance device 10 without complicated robot control.

Figure 9:
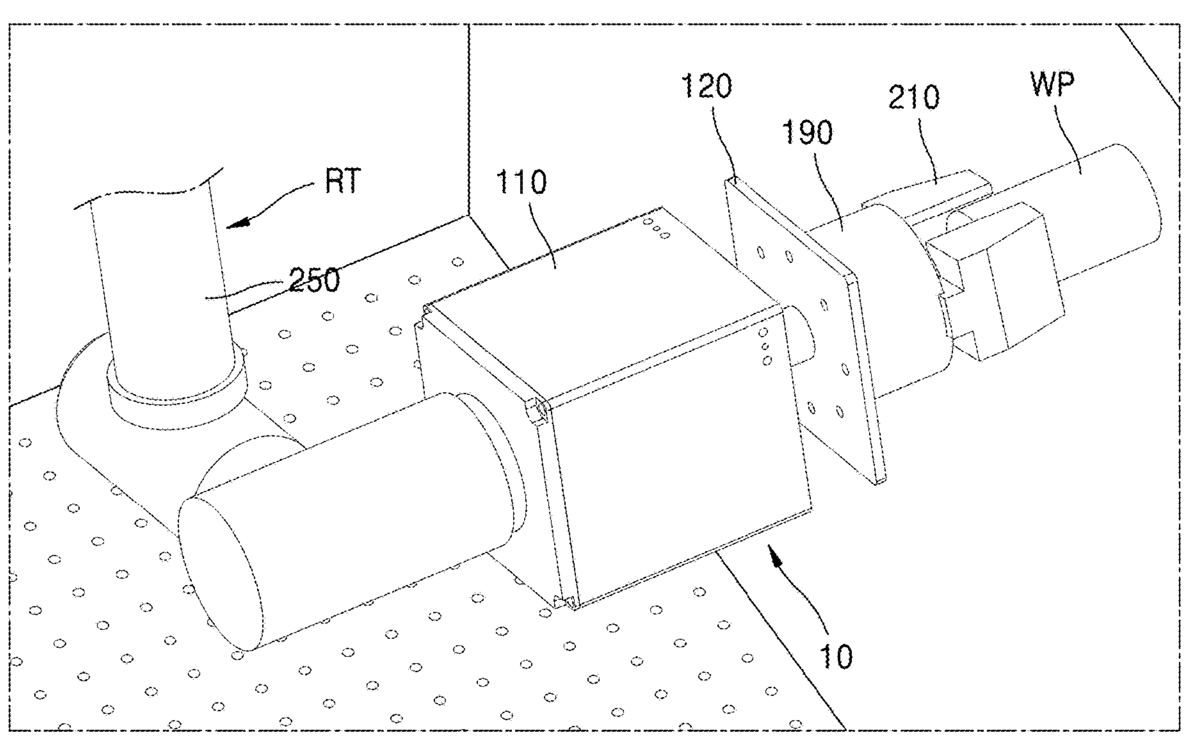
FIG. 9 is a perspective view showing an example of work using a working robot that includes a compliance device according to some embodiments.
Figure 10:
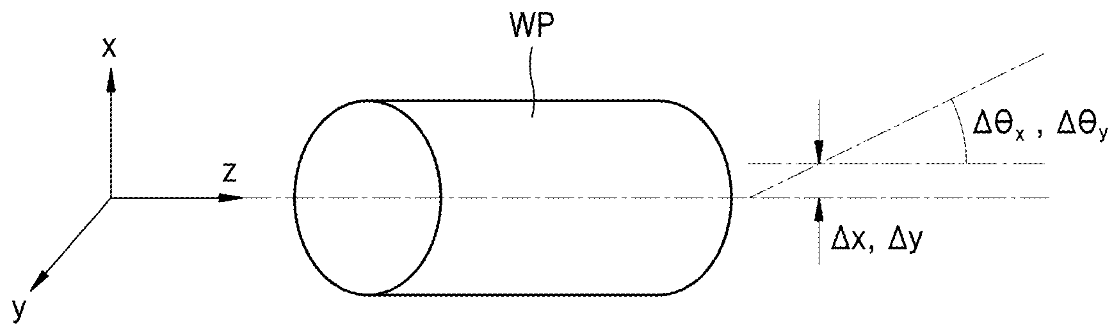
FIG. 10 is a conceptual view showing position errors and rotation errors in the example of work using the working robot of FIG. 9.

FIG. 9 is a perspective view showing an example of work using a working robot RT that includes a compliance device 10 according to some embodiments. FIG. 10 is a conceptual view showing position errors and rotation errors in the example of work using the working robot RT of FIG. 9.

Referring to FIGS. 2, 9 and 10, the working robot RT may include a robot arm 250, a compliance device 10 coupled to an end of the robot arm 250, and a work tool 210 connected to the compliance device 10. The compliance device 10 may include a linear actuator 170 and a rotary actuator 190, which include active axes for performing work.

When the working robot RT performs work (e.g., component fastening work) using a workpiece WP held in the work tool 210, a position error ($\Delta x$) in an X direction, a position error ($\Delta y$) in a Y direction, a rotation error ($\Delta\theta_x$) about an axis parallel to the X direction (e.g., about the X-axis), and/or a rotation error ($\Delta\theta_x$) about an axis parallel to the Y direction (e.g., about the Y-axis) may occur. In embodiments, the position errors and rotation errors below a certain level may be automatically compensated for by the 4 axis-compliant characteristics of the compliance device 10, and thus, the precision and reliability of work using the working robot RT may be improved.

Even though different figures illustrate variations of exemplary embodiments and different embodiments disclose different features from each other, these figures and embodiments are not necessarily intended to be mutually exclusive from each other. Rather, features depicted in different figures and/or described above in different embodiments can be combined with other features from other figures/embodiments to result in additional variations of embodiments, when taking the figures and related descriptions of embodiments as a whole into consideration. For example, components and/or features of different embodiments described above can be combined with components and/or features of other embodiments interchangeably or additionally to form additional embodiments unless the context clearly indicates otherwise, and the present disclosure includes the additional embodiments.

While aspects of the inventive concept have been particularly shown and described with reference to embodiments thereof, it will be understood that various changes in form and details may be made therein without departing from the spirit and scope of the following claims.

What is claimed is:

1. A compliance device comprising:

a fixed platform in which a fixed origin of a fixed coordinate system having 3 axes of X-Y-Z is defined;

a moving platform which is configured to move relative to the fixed platform and in which a moving origin of a moving coordinate system having 3 axes of x-y-z is defined; and a compliance mechanism comprising a plurality of unit compliance mechanisms configured to elastically support the moving platform against the fixed platform, each of the plurality of unit compliance mechanisms comprising a cantilever structure, which comprises a first end fixed to the fixed platform and a second end opposite to the first end, and a link, which is coupled to the second end of the cantilever structure via a first ball joint and coupled to the moving platform via a second ball joint.

2. The compliance device of claim 1, further comprising:

a linear actuator mounted on the moving platform and configured to move a work tool in a Z-axis direction;

a moving plate connected to the linear actuator and configured to be moved in the Z-axis direction by the linear actuator; and a rotary actuator mounted on the moving plate and configured to rotate the work tool about an axis parallel to the Z-axis direction.

3. The compliance device of claim 1, further comprising a force/moment sensor configured to sense amounts of elastic deformation of the plurality of unit compliance mechanisms to thereby detect a force in an X-axis direction, a force in a Y-axis direction, a moment about an axis extending in the X-axis direction as a rotation central axis, and a moment about an axis extending in the Y-axis direction as a rotation central axis which act on the moving origin of the moving platform.

4. The compliance device of claim 3, wherein the force/moment sensor comprises strain gauges which are respectively mounted on the cantilever structures of the plurality of unit compliance mechanisms.

5. The compliance device of claim 1, wherein each of the plurality of unit compliance mechanisms is configured such that a straight-line distance between the first ball joint and the second ball joint is variable.

6. The compliance device of claim 1, further comprising a double universal joint which is located between the fixed platform and the moving platform and configured to limit rotation of the moving platform about a Z-axis.

7. The compliance device of claim 6, wherein the double universal joint comprises:

a lower block fixed to the fixed platform;

an upper block fixed to the moving platform; and a middle block connected to the lower block via a lower cross shaft and connected to the upper block via an upper cross shaft, wherein each of the lower cross shaft and the upper cross shaft has a rotation axis parallel to an X-axis direction and a rotation axis parallel to a Y-axis direction.

8. The compliance device of claim 7, wherein the fixed platform comprises:

a base plate coupled to the lower block; and a plurality of vertical sidewalls which are arranged on the base plate and to which the cantilever structures of the plurality of unit compliance mechanisms are respectively coupled.

9. The compliance device of claim 8, wherein the moving platform comprises:

a central plate; and a plurality of legs extending from different sides of the central plate toward the base plate, wherein each of the plurality of legs is connected to a corresponding unit compliance mechanism among the plurality of unit compliance mechanisms.

10. The compliance device of claim 9, wherein each of the plurality of unit compliance mechanisms is configured such that the link extends in a direction that crosses both an extension direction of the cantilever structure and an extension direction of a corresponding leg among the plurality of legs.

11. The compliance device of claim 1, further comprising:

a first spring support coupled to the moving platform;

a second spring support coupled to the fixed platform; and a tension spring which has one end connected to the first spring support and the other end connected to the second spring support and provides a restoring force to the moving platform.

12. A working robot comprising:

a robot arm;

a compliance device mounted to an end of the robot arm; and a work tool connected to the compliance device and configured to hold a workpiece, wherein the compliance device comprises:

a fixed platform in which a fixed origin of a fixed coordinate system having 3 axes of X-Y-Z is defined;

a moving platform which is configured to move relative to the fixed platform and in which a moving origin of a moving coordinate system having 3 axes of x-y-z is defined;

a compliance mechanism comprising a plurality of unit compliance mechanisms configured to elastically support the moving platform against the fixed platform, each of the plurality of unit compliance mechanisms comprising a cantilever structure, which comprises a first end fixed to the fixed platform and a second end opposite to the first end, and a link, which is coupled to the second end of the cantilever structure via a first ball joint and coupled to the moving platform via a second ball joint;

a linear actuator mounted on the moving platform and configured to move the work tool in a Z-axis direction;

a moving plate connected to the linear actuator and configured to be moved in the Z-axis direction by the linear actuator; and a rotary actuator mounted on the moving plate and configured to rotate the work tool about an axis parallel to the Z-axis direction.

13. The working robot of claim 12, wherein the compliance device is configured to provide compliant characteristics for each of an X-axis direction, a Y-axis direction, a rotational direction having a rotation axis parallel to the X-axis direction, and a rotational direction having a rotation axis parallel to the Y-axis direction.

14. The working robot of claim 12, wherein the compliance device further comprises a force/moment sensor configured to detect a force in an X-axis direction, a force in a Y-axis direction, a moment about an axis parallel to the X-axis direction as a rotation central axis, and a moment about an axis parallel to the Y-axis direction as a rotation central axis which act on the moving origin of the moving platform.

15. The working robot of claim 14, wherein the force/moment sensor comprises strain gauges which are respectively mounted on the cantilever structures of the plurality of unit compliance mechanisms.

16. The working robot of claim 12, wherein each of the plurality of unit compliance mechanisms is configured such that a distance between the first ball joint and the second ball joint is variable.

17. The working robot of claim 12, further comprising a double universal joint located between the fixed platform and the moving platform, wherein the double universal joint comprises:

a lower block fixed to the fixed platform;

an upper block fixed to the moving platform; and a middle block connected to the lower block via a lower cross shaft and connected to the upper block via an upper cross shaft, wherein each of the lower cross shaft and the upper cross shaft has a rotation axis parallel to an X-axis direction and a rotation axis parallel to a Y-axis direction.

18. The working robot of claim 17, wherein the fixed platform comprises:

a base plate connected to the lower block; and a plurality of vertical sidewalls which are arranged on the base plate and to which the cantilever structures of the plurality of unit compliance mechanisms are respectively coupled, wherein the moving platform comprises:

a central plate to which the linear actuator is coupled; and a plurality of legs extending from different sides of the central plate toward the base plate, wherein each of the plurality of legs is rotatably coupled to a corresponding unit compliance mechanism among the plurality of unit compliance mechanisms.

19. The working robot of claim 18, wherein the compliance device further comprises a plurality of tension springs which are respectively arranged between the fixed platform and the different sides of the moving platform and configured to provide restoring forces to the moving platform.

20. A compliance device comprising:

a fixed platform in which a fixed origin of a fixed coordinate system having 3 axes of X-Y-Z is defined;

a moving platform which is configured to move relative to the fixed platform and in which a moving origin of a moving coordinate system having 3 axes of x-y-z is defined;

a compliance mechanism comprising a plurality of unit compliance mechanisms configured to elastically support the moving platform against the fixed platform, each of the plurality of unit compliance mechanisms comprising a cantilever structure, which comprises a first end fixed to the fixed platform and a second end on the opposite side from the first end, and a link, which is coupled to the second end of the cantilever structure via a first ball joint and coupled to the moving platform via a second ball joint;

a linear actuator mounted on the moving platform and configured to move a work tool in a Z-axis direction;

a moving plate connected to the linear actuator and configured to be moved in the Z-axis direction by the linear actuator;

a rotary actuator mounted on the moving plate and configured to rotate the work tool about a Z-axis;

a force/moment sensor which comprises unit sensors configured to sense amounts of elastic deformation of the plurality of unit compliance mechanisms, and is configured to detect a force in an X-axis direction, a force in a Y-axis direction, a moment about an X-axis as a rotation central axis, and a moment about a Y-axis as a rotation central axis which act on the moving origin of the moving platform;

a double universal joint which is located between the fixed platform and the moving platform and configured to limit rotation of the moving platform about the Z-axis; and a gravity compensation mechanism that comprises a first spring support coupled to the moving platform, a second spring support coupled to the fixed platform, and a tension spring connected to the first spring support and the second spring support, wherein each of the plurality of unit compliance mechanisms is configured such that a straight-line distance between the first ball joint and the second ball joint is variable.

* * * * *